United States Patent [19]

Kent

[11] 4,005,803
[45] Feb. 1, 1977

[54] CHEMICAL CONCENTRATE INJECTION SYSTEM

[75] Inventor: Brian Elwood Kent, Des Moines, Iowa

[73] Assignee: Deere & Company, Moline, Ill.

[22] Filed: Aug. 22, 1975

[21] Appl. No.: 606,522

[52] U.S. Cl. .................................. 222/57; 222/177; 137/114; 239/157

[51] Int. Cl.² ......................................... A01C 15/00

[58] Field of Search .......................... 222/14, 17–20, 222/52, 57, 59, 60, 63, 148, 176–178, 129.2, 133, 134, 145; 239/156–158, 147; 137/100, 114

[56] References Cited

UNITED STATES PATENTS

| 2,757,044 | 7/1956 | Gerbracht | 239/157 |
| 2,774,626 | 12/1956 | Gerbracht | 239/157 |
| 2,870,776 | 1/1959 | Marsh | 137/100 |
| 3,770,198 | 11/1973 | Mihara | 137/100 |

FOREIGN PATENTS OR APPLICATIONS

| 624,111 | 7/1961 | Canada | 222/134 |

Primary Examiner—Robert B. Reeves
Assistant Examiner—H. Grant Skaggs

[57] ABSTRACT

An improved apparatus for spraying chemicals from a vehicle. Chemical concentrates from a separate supply tank are injected at a rate proportionate to the vehicle's land travel speed into water which is dispensed at a constant rate. A water pressure activated control means prevents injection of the chemical concentrate into the water line when the water pressure is not within the predetermined range which will assure nozzle spray pattern.

6 Claims, 2 Drawing Figures

CHEMICAL CONCENTRATE INJECTION SYSTEM

BACKGROUND OF THE INVENTION

The present invention relates generally to agricultural spraying implements and more specifically to an improved apparatus for dispensing concentrates at a rate proportionate to the implement's land travel speed into a diluent which is dispersed at a predetermined constant rate.

Spray nozzles operated by water pressure provide the most satisfactory performance when operating at a pressure close to that for which they were designed. For consistent spray pattern performance and uniform coverage that operating pressure should be maintained regardless of speed assumed by the spraying implement.

A uniform coverage is most easily achieved when the density or amount of chemical injected into the water and thereby deposited on the ground or plants is constant per unit of distance traveled. Because some spraying operations are carried out from machines which travel at variable speeds, the rate of chemicals deposited cannot be consistently maintained unless dispersed in proportion to the implement's forward speed.

In the past massive and bulky pumps and drives have been required for injecting chemicals into the water stream in proportion to the vehicle forward speed. This practical limitation has been essentially one involving flow control and has effectively prohibited the use of several chemicals together or separately where each chemical's density of deposit dictated that it be provided its own ground speed regulating and metering equipment.

A further problem is often encountered when the chemical concentrate injected into the water system is not uniformly deposited on the ground or plants because the water pressure is not consistantly maintained above a minimum threshold value to assure the desired spray pattern. Accordingly, provisions should be made for preventing injection of the chemical concentrate supply into the water line whenever the water line pressure drops below that threshold pressure. Not only should provision be made for the chemical supply to be stopped when the water pressure drops below the threshold value, but also the water supply itself should be stopped.

It is therefore an object of the present invention to provide a compact variable flow rate chemical metering means having the ability to pump in direct relation to the implement's ground speed. This metering means should also be equipped with means for varying its constant of proportionality to enable the operator to inject chemicals into the water line at whatever rate is required to realize the desired deposit density upon the ground or plants.

It is further an object to provide a water supply system capable of maintaining a predetermined minimum water pressure to insure that the desired nozzle spray pattern is realized.

Yet another object of the present invention is to provide a chemical concentrate supply system that will inject chemical concentrate into the water supply line only when the proper water spray pattern is realized.

A still further object of the present invention is to provide a chemical concentrate supply system separate from the water supply to avoid the problems and expenses which occur when chemicals contaminate the water line or other chemical supply lines.

Another object of the present invention is to provide a simple and inexpensive chemical concentrate injection system having a simple mechanism for drivingly powering the chemical pump in relation to the vehicle forward ground speed.

SUMMARY OF THE INVENTION

Accordingly, applicant has provided an improved apparatus for spraying chemicals wherein water is supplied to the spray nozzles at a pressure only when the line pressure is above a particular level to thereby assure a consistent spray pattern. The concentrated chemical is forced into the water stream at a rate proportional to implement travel speed to assure that the amount of chemical dispensed per unit distance travel is maintained constant, and a water pressure activated shuttle valve is provided in the chemical supply line to assure that no chemical concentrate is dispensed unless the proper water pressure and spray pattern are realized.

DESCRIPTION OF THE PREFERRED EMBODIMENT

Figure 1:
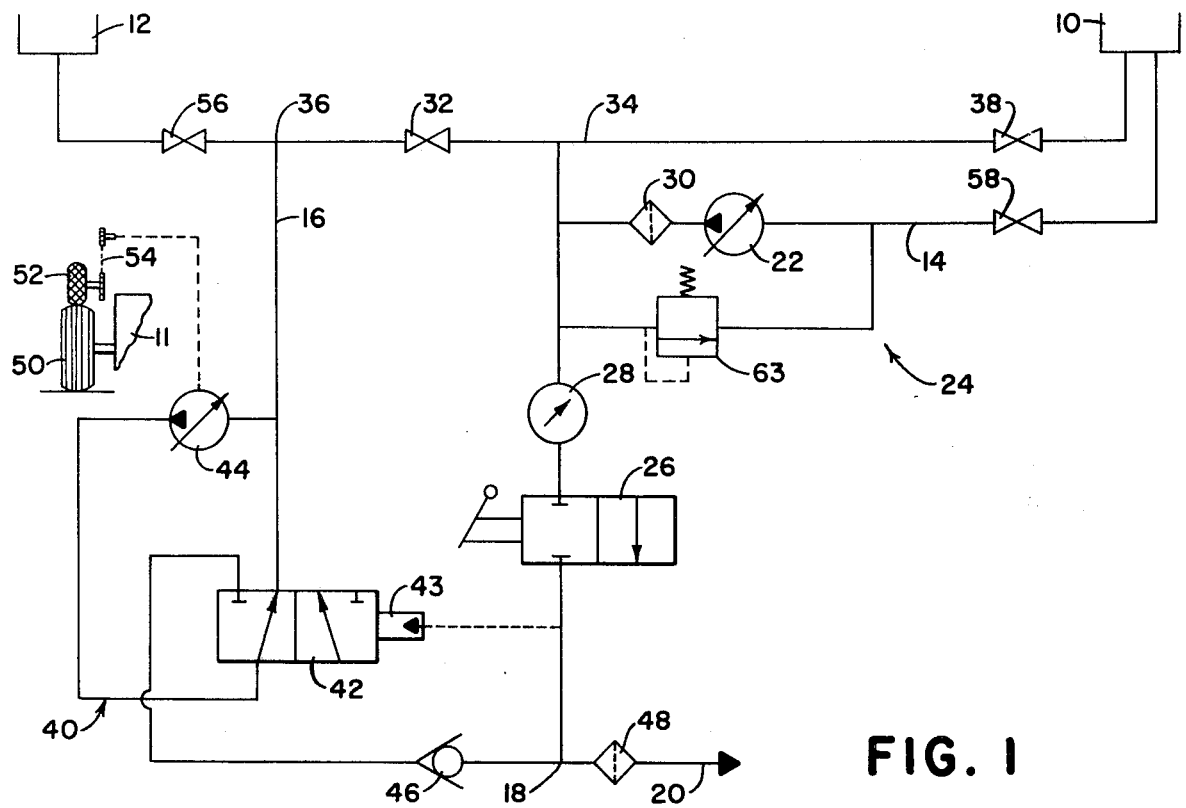
FIG. 1 is a diagrammatic illustration of the chemical concentrate injection apparatus embodying the present invention.
Figure 2:
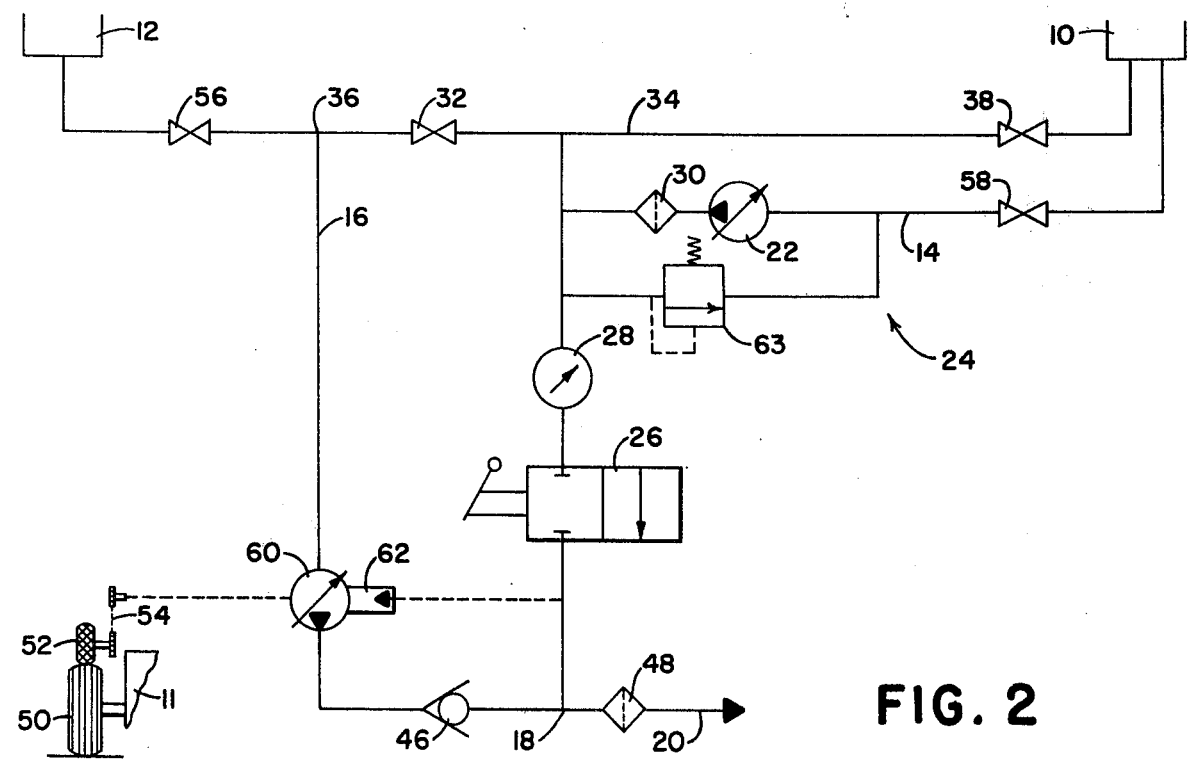
FIG. 2 is a diagrammatic illustration of a modified form of the chemical concentrate injection apparatus.

The chemical concentrate injection system is diagrammatically illustrated in FIGS. 1 and 2 and includes separate holding and pumping systems for the water and chemical supplies.

These systems are designed to be mounted on a mobile vehicle or frame, indicated in part at 11, for use in spraying chemicals while the vehicle or frame is advanced across the field. As illustrated in the drawings, the preferred embodiment includes only a single vented water supply tank 10 and a single vented chemical supply container or tank 12. The water tank 10 and chemical tank 12 are each provided with a supply line, identified respectively by the numbers 14 and 16, and the fluids are then pumped from the tanks through the lines 14 and 16 and intermixed at the juncture 18 of the lines just upstream of the nozzle supply lines 20 and nozzles to avoid contamination in the lines. Additional tanks and lines can be added should it be desired to inject several chemicals into the water line.

A centrifugal pump or means for creating pressure 22 driven by a prime mover (not shown) which would probably be the vehicle engine, is provided in the water line 14 to pump the water from the tank 10 to the nozzles.

The pump 22 is inserted into a loop 24 including an adjustable pressure relief valve 63 formed in the water line upstream from a manual flow control valve 26 having a water pressure gage 28. The adjustable pressure relief valve 63 permits the operator to adjust the pressure at which the valve 63 will permit water to flow back to the pump 22. Accordingly, the valve 63 can be adjusted to divert a predetermined flow from the constant rate pump 22 to maintain the pressure at gage 28 at whatever level is desired by the operator. Should the lines downstream of the manual control valve 26 become clogged, the relief valve 63 will cause the water to flow to the pump 22 to relieve the pressure build up. When the threshold water line pressure is reached, the manual flow control valve 26 can be opened to cause the water to flow to the nozzles. The manual valve 26 could be replaced with an automatic valve which would shut off the water flow to the nozzles when the pressure dropped below the desired threshold value to insure that proper spray pattern is realized during the operation when the operator's attention is not on the spray pattern.

A strainer 30 is inserted into the water line 14 downstream of the centrifugal pump 22 to filter the water and prevent clogging of the nozzles by foreign matter. A flush valve 32 has been provided in the line between the upstream water supply line 34 and the chemical supply line-water line juncture 36 and can be manually opened to permit the chemical supply line 16 to be flushed and cleansed with uncontaminated water from the water tank 10. The chemical supply line 16 can be flushed either by the flow of gravity fed water when the on-off valve 38 is opened or by the pressurized water supply when the pump 22 is running and flush valve 32 is opened.

The chemical supply line 16 as illustrated in FIG. 1 includes a loop 40 having inserted therein a water pressure activated diverting means for diverting chemical flow in the form of shuttle valve 42 and a variable displacement ground driven pump 44. A check valve 46 is inserted immediately upstream of the water line chemical line juncture 18 to prevent the flow of water into the chemical line 16 and to also prevent the flow of chemical into the water system unless there is at least a five p.s.i. differential between the water line pressure and the chemical line pressure.

The shuttle valve 42 includes a control means having a water pressure sensing means 43 for diverting the chemical flow. When the water pressure is below a minimum threshold value, the chemical flow is retained within the loop 40. After the water pressure has reached the threshold value, the desired spray pattern will be realized and the shuttle valve 42 will divert the chemical to the juncture 18 where it is injected into the water line. This mixture will then pass through the strainer 48 and be sprayed through the nozzles onto the ground or plants.

The pump or variable flow means 44 in the FIG. 1 embodiment is preferably a variable displacement piston pump provided with means for causing the pump 44 to vary the chemical flow rate in proportion to the vehicle speed. This means includes a ground wheel 50 drivingly powering a drive wheel 52 which in turn drives the chain 54 which powers the pump 44 at a rate proportional to the vehicle speed. The pump 44 includes an adjustable variable flow means capable of being manually adjusted by the operator to vary the chemical flow rate. A pump satisfactory for this purpose would be similar to models designated RP and manufactured by Fliud Metering, Inc. of Oyster Bay N.Y. To vary the flow rate, the pump's displacement per stroke is adjusted so that the desired volume of chemical per unit distance traveled is injected into the water line for spraying.

For the spraying operation, the operator will first fill the chemical and water supply tanks. Because the tanks are separate, each can be filled separately and no mixing is required. Contamination of the lines and undue exposure of the operator to the chemicals is in this way minimized.

Before filling the tanks, the operator will have first closed the flush valve 32 and the on-off valve 38. After filling the tanks, he will then open the water valve 58 and chemical concentrate supply line valve 56 and adjust the piston pump 44 for the displacement that is desired to realize the rate of chemical flow per unit distance traveled. The water pump 22 is then activated and after the pressure has reached a desired level as indicated by the gage 28, the flow control valve 26 will be manually opened to permit water to flow to the spray nozzles. Pressure from the water line will shift the shuttle valve 42 to close the loop 40 and cause the chemicals to flow toward the intermix juncture 18 and nozzle line 20. No chemicals can flow into the water supply system until the vehicle begins to advance across the field.

As the vehicle advances over the field the ground wheels 50 will drive the drive wheel 52 and power the chemical concentrate piston pump 44. The piston pump 44 will inject chemicals at a rate proportionate to the speed of vehicle advancement over the field into the water line 14. If the water line pressure drops below that threshold level required to maintain the desired spray nozzle pattern, the pressure sensitive shuttle valve 42 will act to divert the chemical flow back through the loop 40 thereby avoiding waste of chemicals. At the same time, the water shut off valve 26 could be used to divert the water flow into the water line loop 24 and stop all flow of water to the nozzles.

An alternate embodiment is illustrated in FIG. 2 and discloses in place of the chemical line loop 40 a variable displacement pump 60 activated by a pressure sensitive means 62. This pump 60 will displace no chemical in the line unless the water pressure sensitive means 62 indicates a pressure in excess of that threshold value desired.

While the embodiment illustrated in FIG. 1 contains a loop 40 which permits diversion of the chemical flow when water pressure is too low, the embodiment illustrated in FIG. 2 performs identically in that no chemical concentrate is pumped unless a minimum water pressure is realized. When the pressure is realized, the chemical concentrate is then dispensed in proportion to the vehicle advancement rate.

I claim:

1. An apparatus for use in spraying fluids from a vehicle comprising: a diluent supply supported on the vehicle; at least one container for a concentrate formulation supported on the vehicle; a diluent line connected to said diluent supply; means in said diluent line for creating a pressure in said diluent line; a concentrate line connected between said container and said diluent line downstream of said pressure creating means; variable flow means in said concentrate line for creating a variable flow rate therein having a pressure greater than the pressure in said diluent line; means coupled with said variable flow means for causing said flow means to vary the concentrate flow rate in proportion to the speed of the vehicle; diverting means in said concentrate line between the variable flow means and diluent line for directing all concentrate flow to either the diluent line or variable flow means; and control means between the diluent line and diverting means including pressure sensing means for causing the diverting means to divert the concentrate flow to the variable flow means when the diluent line pressure is not greater than a specific value.

2. The invention defined in claim 1 wherein the variable flow means includes pump means adjustable to deliver a variable flow.

3. The invention defined in claim 1 wherein the diverting means and the control means is a dilutent pressure activated shuttle valve.

4. An apparatus for use in spraying mixtures from a vehicle comprising: a dilutent supply supported on the vehicle; at least one container for a concentrate formulation supported on the vehicle; a dilutent line connected to said dilutent supply; means in said dilutent line for creating a pressure in said line; a concentrate line connected between said container and said dilutent line downstream of said pressure creating means; a variable displacement pump in said concentrate line for causing a variable flow rate therein having a pressure greater than the pressure in said dilutent line; means coupled with the variable displacement pump to cause said pump to vary the flow rate in said concentrate line in proportion to the speed of the vehicle; pressure sensing means between said variable displacement pump and said dilutent line for sensing the dilutent pressure in said line; and control means cooperative with the sensing means for directing all concentrate flow to the variable displacement pump when the dilutent line pressure is not greater than a specific value.

5. An apparatus for use in spraying mixtures from a vehicle comprising: a dilutent supply supported on the vehicle; at least one container for a concentrate formulation supported on the vehicle; a dilutent line connected to said dilutent supply; means in said dilutent line for creating a pressure; a concentrate line connected between said container and said dilutent line downstream of said pressure creating means; variable flow means in said concentrate supply line for creating a variable flow rate therein having a pressure greater than the pressure in the dilutent line; means coupled with said variable flow means for causing said flow means to vary the concentrate flow rate in proportion to the speed of the vehicle; valve means in said concentrate line between the variable flow means and dilutent line; and valve control means between said dilutent line and said valve means including a dilutent pressure sensing means for preventing concentrate flow to the dilutent line when the dilutent line pressure is not greater than a specific value.

6. An apparatus for use in spraying mixtures from a vehicle comprising: a dilutent supply supported on the vehicle; at least one container for a concentrate formulation supported on the vehicle; a nozzle supply line; a dilutent line between said dilutent supply and said nozzle supply line, and having a loop therein; means in said dilutent line loop for creating a pressure therein; a concentrate line between said container and said nozzle supply line, and having a loop therein; variable flow means in said concentrate line loop for creating a variable flow rate in said line having a pressure greater than the pressure in the dilutent line; means coupled with said variable flow means for causing said flow means to vary the concentrate flow rate in proportion to the speed of the vehicle; a manually controlled valve means in said dilutent line loop for selectively retaining flow within the loop or directing flow to said nozzle supply line; a pressure actuated valve means in said concentrate line loop between the variable flow means and nozzle supply line for retaining concentrate flow within its loop or directing flow to said nozzle supply line, said valve means being connected to and responsive to dilutent line pressure in the dilutent line downstream of said dilutent line loop for retaining concentrate flow within the loop in the chemical line or directing concentrate flow to said nozzle supply line when the dilutent line pressure is greater than a specific value.

* * * * *